US007970007B2

(12) United States Patent
Tanaka

(10) Patent No.: US 7,970,007 B2
(45) Date of Patent: Jun. 28, 2011

(54) COMMUNICATION APPARATUS AND RETRIEVAL TABLE MANAGEMENT METHOD USED FOR COMMUNICATION APPARATUS

(75) Inventor: Hiroshi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 580 days.

(21) Appl. No.: 11/857,466

(22) Filed: Sep. 19, 2007

(65) Prior Publication Data

US 2008/0075117 A1    Mar. 27, 2008

(30) Foreign Application Priority Data

Sep. 22, 2006   (JP) ................. 2006-256559

(51) Int. Cl.
*H04L 12/28*    (2006.01)
*H04Q 11/00*    (2006.01)
(52) U.S. Cl. ............... 370/465; 370/471; 370/536
(58) Field of Classification Search .......... 370/471, 370/400, 389, 473, 536, 465
See application file for complete search history.

(56) References Cited

U.S. PATENT DOCUMENTS

| 6,735,198 | B1 * | 5/2004 | Edsall et al. | 370/389 |
| 6,807,172 | B1 * | 10/2004 | Levenson et al. | 370/389 |
| 2005/0108425 | A1 * | 5/2005 | Rabinovitch | 709/238 |
| 2006/0039384 | A1 * | 2/2006 | Dontu et al. | 370/400 |

FOREIGN PATENT DOCUMENTS

JP    2005-86668    3/2005

* cited by examiner

*Primary Examiner* — Derrick W Ferris
*Assistant Examiner* — Maharishi Khirodhar
(74) *Attorney, Agent, or Firm* — Young & Thompson

(57) ABSTRACT

A communication apparatus is provided which avoids such a situation that retrieval tables do not correspond with each other, and a broadcast is induced. When an input port or an output port determined by switch function units 121, 131 is a port belonging to a Link Aggregation group, frame identifying units 122, 132 copies a frame, outputs the frame from the output port determined by the switch function units 121, 131, and transfers the copied frame to a header editing 123 and 133. The header editing units 123, 133 generate a header inside an apparatus including a field indicating whether it is a copied frame and a field storing an input port number to attach the header to the frame, and transfer the frame from one of frame transferring units 13, 12 to another.

5 Claims, 6 Drawing Sheets

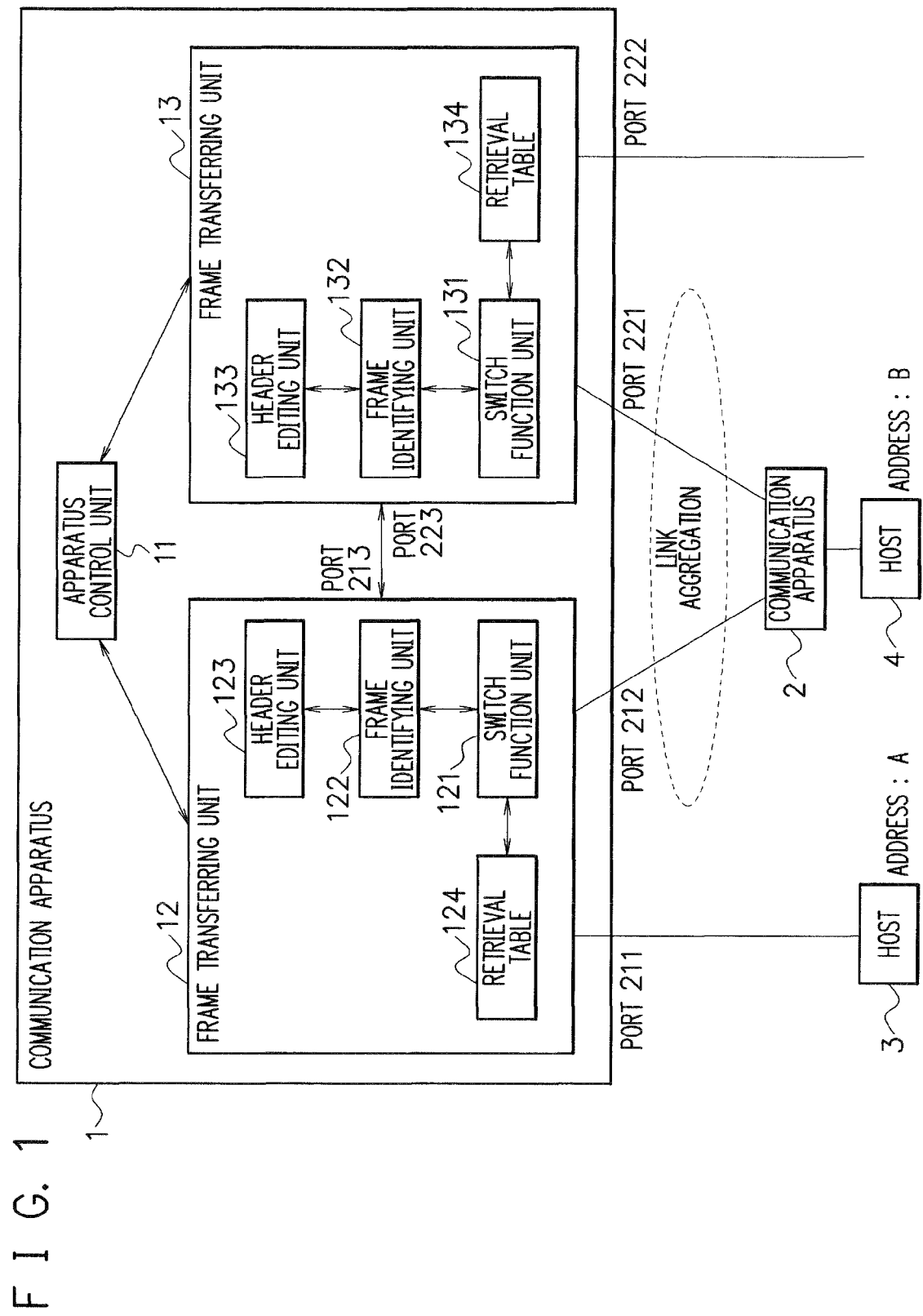

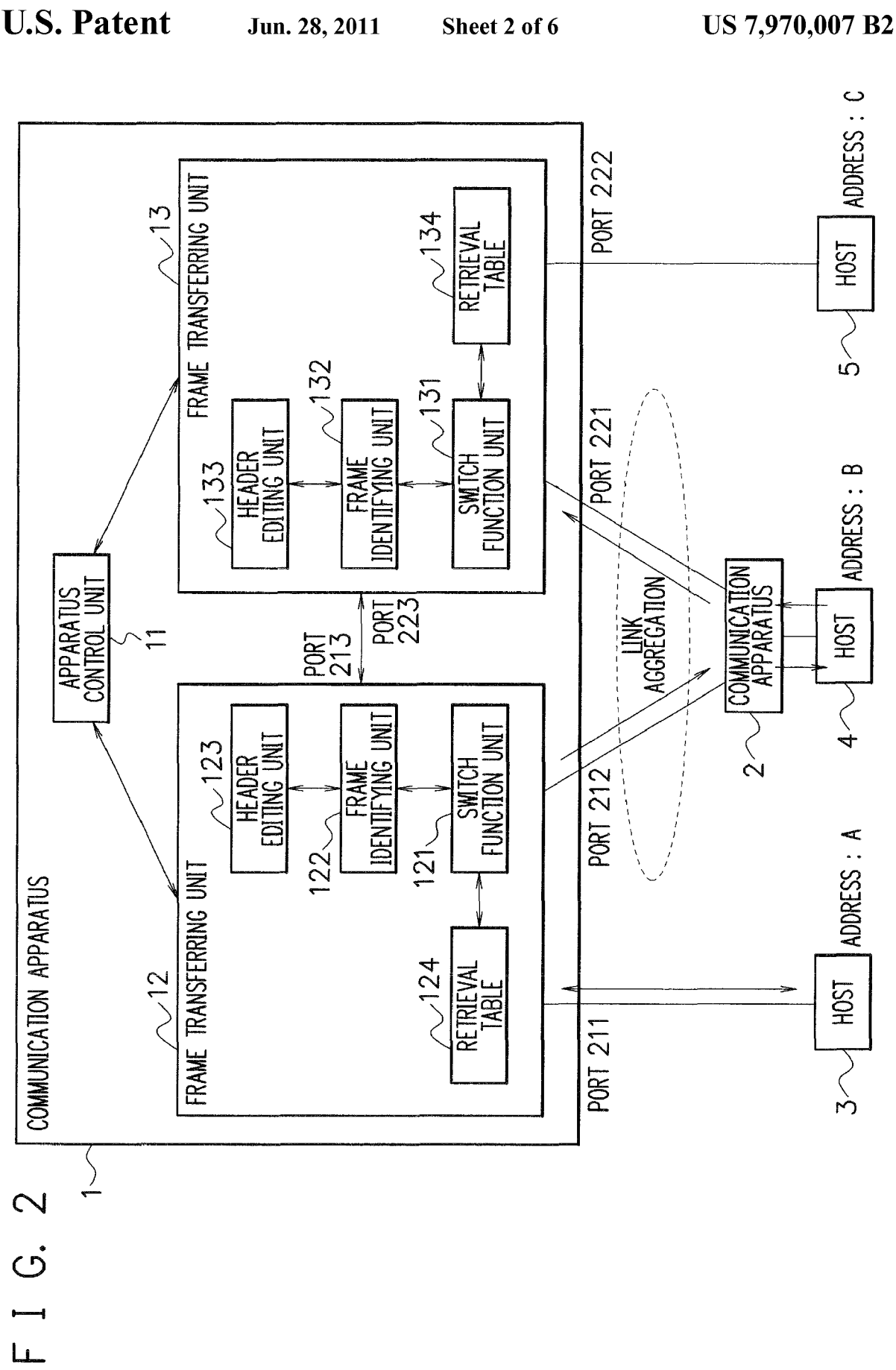

F I G. 3

RETRIEVAL TABLE 124

| ADDRESS | PORT NUMBER | | |
|---------|-------------|---|---|
| A ☆ | 211 | | |

TRANSFER FRAME LEARNED IN FRAME TRANSFERRING UNIT 12 TO FRAME TRANSFERRING UNIT 13 →

RETRIEVAL TABLE 134

| ADDRESS | PORT NUMBER | | |
|---------|-------------|---|---|
| | | | |

FRAME TRANSFERRING UNIT 13 LEARN ENTRY OF A LEARNED IN FRAME TRANSFERRING UNIT 12

RETRIEVAL TABLE 124

| ADDRESS | PORT NUMBER | | |
|---------|-------------|---|---|
| A | 211 | | |

← LEARNING STATES CORRESPOND WITH EACH OTHER →

RETRIEVAL TABLE 134

| ADDRESS | PORT NUMBER | | |
|---------|-------------|---|---|
| A ☆ | 211 | | |

AS AGING TIMER IS CONTINUED TO BE UPDATED, ENTRY IS NOT DELETED

☆ : LEARNING

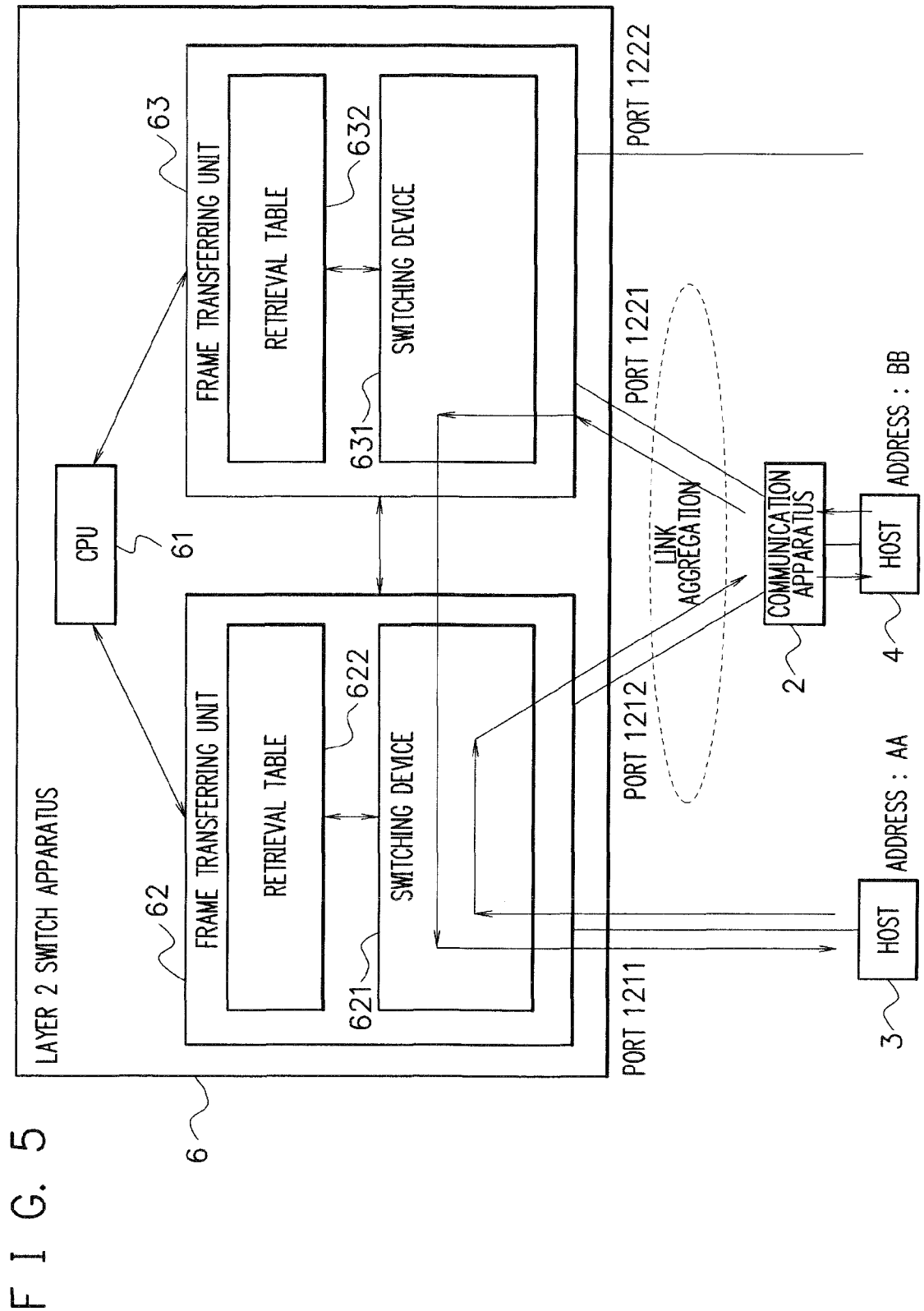
F I G. 5

FIG. 6

| RETRIEVAL TABLE 622 | |
|---|---|
| ADDRESS | PORT NUMBER |
| AA | 1211 |
| BB | 1221 |
| | |

| RETRIEVAL TABLE 632 | |
|---|---|
| ADDRESS | PORT NUMBER |
| AA | 1211 |
| BB | 1221 |
| | |

AGING TIMER OF ENTRY OF AA OF RETRIEVAL TABLE 632 PASSES

LEARNING STATES DO NOT CORRESPOND WITH EACH OTHER

| RETRIEVAL TABLE 622 | |
|---|---|
| ADDRESS | PORT NUMBER |
| AA | 1211 |
| BB | 1221 |
| | |

| RETRIEVAL TABLE 632 | |
|---|---|
| ADDRESS | PORT NUMBER |
| ~~AA~~ | ~~1211~~ |
| BB | 1221 |
| | |

AGING TIMER OF ENTRY OF AA IS NOT UPDATED, AND ENTRY IS AGED OUT

COMMUNICATION APPARATUS AND RETRIEVAL TABLE MANAGEMENT METHOD USED FOR COMMUNICATION APPARATUS

This application is based upon and claims the benefit of priority from Japanese patent application No. 2006-256559, filed on Sep. 22, 2006, the disclosure of which is incorporated herein in its entirety by reference.

BACKGROUND OF THE INVENTION

The present invention pertains to a communication apparatus and a retrieval table management method used for the communication apparatus, specifically to a retrieval table management method used for a layer 2 switch apparatus.

Description of Related Art

When a layer 2 switch apparatus includes a plurality of frame transferring units (e.g. a line card, etc.) and a switching device is individually provided in each of the frame transferring units, generally, the layer 2 switch apparatus internally includes a retrieval table having entries obtained by combining addresses and port numbers in each switching device, and in many cases, each of the retrieval tables is independently managed (registration of entries (learning), deletion, etc.) between the frame transferring units.

In such a layer 2 switch apparatus, when a Link Aggregation set up between the frame transferring units is configured with an external communication apparatus, a frame may be received and transmitted in the fixedly different frame transferring units with each selection algorithm of the layer 2 switch apparatus and the external apparatus.

In this case, because the switching device of one side of the frame transferring units does not receive a frame, a transmitting source address is not registered. The retrieval tables are independently managed between the frame transferring units in one apparatus, and processing to cause them to correspond with each other is not carried out, so that such a state is induced that the retrieval tables do not correspond with each other between the frame transferring units.

Because the retrieval tables do not correspond with each other, a unicast frame is processed as an Unknown unicast due to a retrieval mishit in the frame transferring unit in which an entry of a transmitting source address is not registered, so that it is a problem that unnecessary broadcasts are permanently induced, which are not normally induced if the retrieval tables correspond with each other, and become unable to be avoided.

The above operations of a conventional switch apparatus will be described referring to FIG. 5 and FIG. 6. As illustrated in FIG. 5, when communications between a host 3 and host 4 are transmitted and received through different frame transferring units 62 and 63 respectively, a frame of a transmitting source address [AA] becomes not to be transferred to a switching device 631. Each entry of retrieval tables 622 and 632 includes an aging timer, and the entry is deleted whose aging timer detects that a certain period in time has passed. Hereinafter, such an entry is referred to as an aged-out entry.

Thus, a frame of the transmitting source address [AA] becomes not to be transferred to the switching device 631, and as illustrated in FIG. 6, an entry of the address [AA] in the retrieval table 632 is aged out. If a frame of a destination address [AA] is transmitted to a port 1221 from the host 4 to the host 3, it becomes a retrieval mishit, and a broadcast is induced. It is necessary to cause the retrieval tables 622 and 632 of frame transferring units 62 and 63 to correspond with each other to avoid such a problem that a broadcast is induced.

Such a method is considered as one measure to cause the states of the retrieval tables 622 and 632 to correspond with each other between the frame transferring units 62 and 63 that the changes of the states (an addition by an entry registration, or a deletion by an aging out) of the retrieval tables 622 and 632 are notified to a CPU (Central Processing Unit) 61 (an apparatus control unit), or are detected by the confirmation from the CPU 61, and the changed contents are also reflected in the retrieval table on the other frame transferring unit.

However, this method is executed by the CPU 61, and is processed by software, so that there are such problems for the processing performance that it takes a certain amount of time to detect the changes of the state, and it is delayed to reflect the changes to the retrieval tables 622 and 632. In addition, the load of the CPU 61 is increased because of a processing for retrieving entries to be changed from the retrieval tables 622 and 632, so that other processing such as managements executed by the CPU 61 for the apparatus may be troubled. Furthermore, there is such a problem that the retrieval tables 622 and 632 cannot be managed if any failure is induced in the CPU 61.

Such a method is proposed as a measure to solve the problem regarding the induction of broadcast that learning packets are periodically generated and transmitted to all the frame transferring units (in this case, line card) having a Link Aggregation under a prescribed condition (for example, refer to Japanese Patent Laid Open Publication No. 2005-086668). Here, the learning packet is a packet used for managing the retrieval tables.

However, in the above conventional method for managing the retrieval tables, when the technique described in Japanese Patent Laid Open Publication No. 2005-086668 is applied, every time the prescribed condition is detected, it is necessary to periodically generate and transmit the learning packet with a path learning function of each frame transferring unit, requiring a heavy processing workload in each frame transferring unit.

In addition, while the conventional method for managing the retrieval tables includes such a mechanism that a control information communication for synchronizing a table between the frame transferring units is executed at an appropriate timing, and efficiently executes the control information communication, the conventional method requires complicated circuitry and the cost is increased.

SUMMARY OF THE INVENTION

An exemplary object of the present invention is to provide a communication apparatus and a retrieval table management method used for the communication apparatus, which solve the above problems, and avoid such a situation without increasing the load and the cost in the frame transferring units that the retrieval tables are not associated with each other and the broadcasts are induced.

A first communication apparatus according to an exemplary aspect of the present invention is a communication apparatus which includes a plurality of frame transferring units being provided with a retrieval table for retrieving an output port of a frame and including a switch function unit, and configures a Link Aggregation between the frame transferring units, wherein each of the plurality of frame transferring units causes the states of the retrieval tables to correspond with each other among the frame transferring units, by copying a frame which is determined to be transmitted and received at a port configuring the Link Aggregation and directly transferring the copied frame to a switch function unit of another frame transferring unit.

A second communication apparatus according to an exemplary aspect of the present invention is a communication apparatus which includes a plurality of frame transferring units being provided with a retrieval table for retrieving an output port of a frame and including a switch function unit, and configures a Link Aggregation between the frame transferring units, wherein each of the plurality of frame transferring units causes the states of the retrieval tables to correspond with each other among the frame transferring units, by copying an input frame and directly transferring the copied frame to a switch function unit of another frame transferring unit.

A first retrieval table management method according to an exemplary aspect of the present invention is a retrieval table management method used for a communication apparatus which includes a plurality of frame transferring units being provided with a retrieval table for retrieving an output port of a frame and including a switch function unit, and configures the Link Aggregation between the frame transferring units, wherein each of the plurality of frame transferring units causes the states of the retrieval tables to correspond with each other among the frame transferring units, by copying a frame which is determined to be transmitted and received at a port configuring a Link Aggregation and directly transferring the copied frame to a switch function unit of another frame transferring unit.

A second retrieval table management method according to an exemplary aspect of the present invention is a retrieval table management method used for a communication apparatus which includes a plurality of frame transferring units being provided with a retrieval table for retrieving an output port of a frame and including a switch function unit respectively, and configures a Link Aggregation between the frame transferring units, wherein each of the plurality of frame transferring units causes the states of the retrieval tables to correspond with each other among the frame transferring units, by copying an input frame and directly transferring the copied frame to a switch function unit of another frame transferring unit.

BRIEF DESCRIPTION OF THE DRAWINGS

The objects and features of the present invention will become more apparent from the consideration of the following detailed description taken in conjunction with the accompanying drawings, in which:

FIG. 1 is a block diagram illustrating a configuration of a communication apparatus according to an embodiment of the present invention;

FIG. 2 is a diagram illustrating operations of the communication apparatus according to the embodiment of the present invention;

FIG. 3 is a diagram illustrating a management processing of a retrieval table according to the embodiment of the present invention;

FIG. 5 is a block diagram illustrating a configuration of a conventional communication apparatus; and FIG. 6 is a diagram illustrating a management processing of a conventional retrieval table.

DESCRIPTION OF EXEMPLARY EMBODIMENTS

Figure 4:
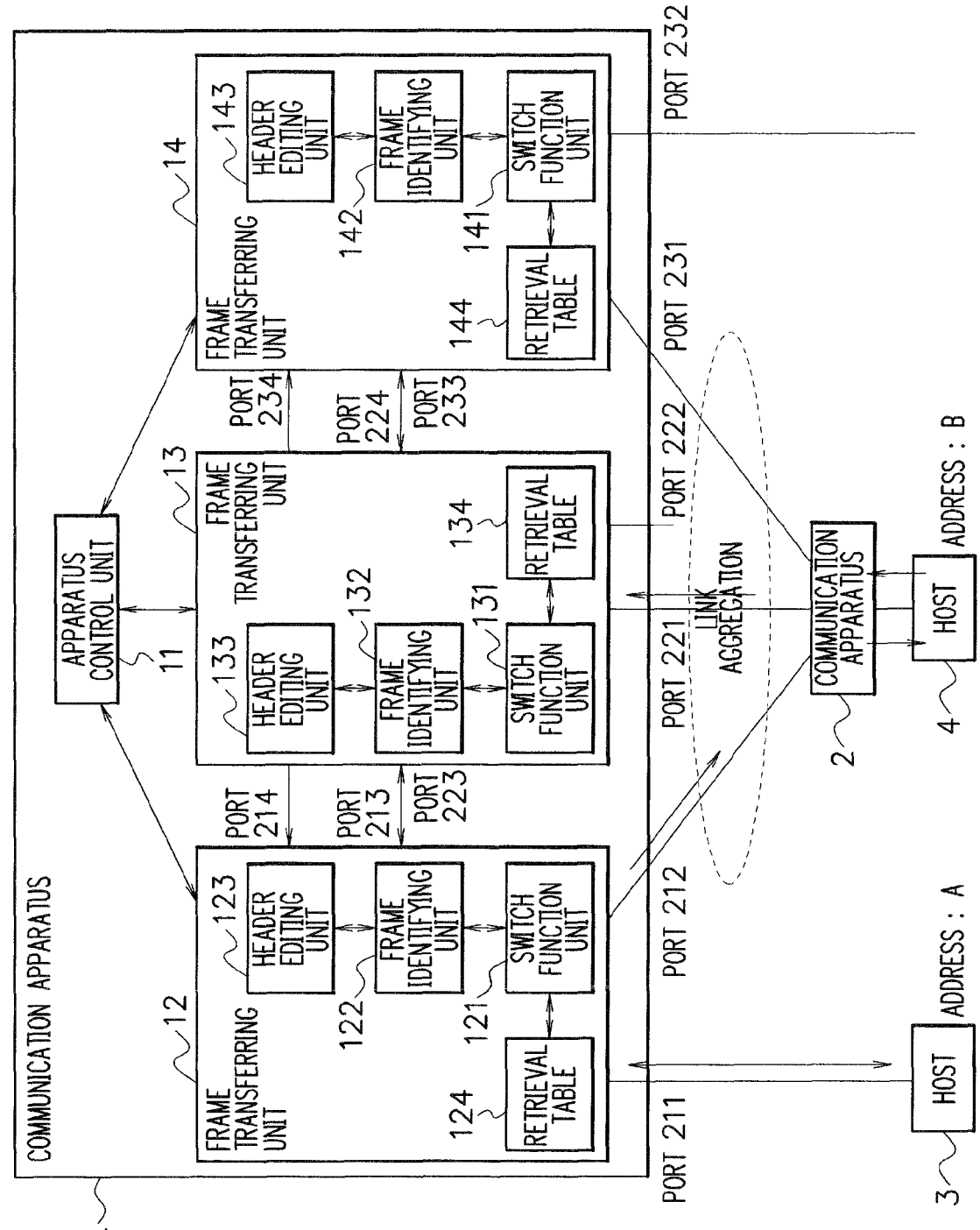
FIG. 4 is a block diagram illustrating a configuration of a communication apparatus according to another embodiment of the present invention.

Next, exemplary embodiments of the present invention will be described referring to the drawings. FIG. 1 is a block diagram illustrating a configuration of a communication apparatus. In FIG. 1, a communication apparatus 1 is configured with an apparatus control unit 11 and two frame transferring units 12 and 13 (e.g. line card, etc.). In a following description, as the configurations and the operations of the two frame transferring units 12 and 13 are same as each other, the transferring from the frame transferring units 12 to the frame transferring units 13 will be described, and the description of the transferring from the frame transferring units 13 to the frame transferring units 12 will be omitted.

The frame transferring units 12 includes two ports (port 211 and 212) for connecting to a communication apparatus 2 outside an apparatus through a transmission medium to transmit and receive frames to and from the communication apparatus 2 outside an apparatus. Furthermore, the frame transferring unit 12 includes a port 213 that transmits and receives frames to and from the frame transferring unit 13 and connects the frame transferring unit 12 with the frame transferring unit 13. The frame transferring unit 12 includes a switch function unit 121, a frame identifying unit 122, a header editing unit 123, and a retrieval table 124. Meanwhile, the frame transferring unit 13 includes ports 221, 222, and 223, and includes a switch function unit 131, a frame identifying 132, a header editing unit 133, and a retrieval table 134.

The switch function unit 121 includes a general frame switch function, retrieves the retrieval table 124 including entries obtained by combining an address and a port number through the use of a destination address of a frame as a key, and determines an output port. Each entry of the retrieval table 124 includes an aging timer, and an entry is deleted whose aging timer detects that a certain period in time has passed. Hereinafter, such an entry is referred to as an aged out entry.

The switch function unit 121 checks whether a transmitting source address of a frame is registered in the retrieval table 124, and when it is not registered, registers (learns) it as well as a receiving port. When it has been already registered, the switch function unit 121 updates the aging timer of the corresponding entry.

Furthermore, the switch function unit 121 configures a Link Aggregation, and when an output port belongs to a Link Aggregation group including a plurality of ports configuring the Link Aggregation, selects one output port from ports in the Link Aggregation group according to a previously designated distribution algorithm.

When a frame is a unicast frame, and an output port determined by the switch function unit 121 and an input port belong to the same frame transferring unit 12, the switch function unit 121 transfers the frame to the frame identifying unit 122.

When a frame is a unicast frame, and the output port determined by the switch function unit 121 belongs to another frame transferring unit 13, the switch function unit 121 transfers the frame to the frame identifying unit 123.

Furthermore, when a frame is a broadcast frame, the switch function unit 121 outputs the frame to a port belonging to the own unit (the frame transferring unit 12) (excluding a receiving port), and also transfers the frame to the header editing unit 123.

The frame identifying unit 122 identifies whether an input port or an output port determined by the switch function unit 121 is a port belonging to the Link Aggregation group. When any one of the input port and the output port of a frame is a Link Aggregation port, the frame identifying unit 122 copies (duplicates) the frame, outputs the frame from the output port determined by the switch function unit 121, and also transfers the copied frame to the header editing unit 123.

The header editing unit 123 generates a header inside an apparatus, which includes a field indicating whether it is a copied frame, and a field storing an input port number, attaches it to the frame, and transfers it to another frame transferring unit 13.

The header editing unit 123 sets a copy field to the frame from the frame identifying unit 122, and transfers it to another frame transferring unit 13. At this time, a data part of the copied frame is not necessary for the registration processing at a transferring destination, the frame transferring unit 13, so that the header editing unit 123 deletes the data part. Thereby, in the present embodiment, the amount of data transferred between the frame transferring units 12 and 13 is reduced, and the transmission band between the frame transferring units 12 and 13 is efficiently utilized.

The header editing unit 123 does not set a copy field to the frame from the switch function unit 121, and transfers it to another frame transferring unit 13.

In the frame transferring unit 13 receiving the frame to which a header inside an apparatus is attached, like the above frame switch processing of a transferring source, the switch function unit 131 checks whether a transmitting source address of the frame is registered in the retrieval table 134, and when it is not registered, registers it with an input port number of a header inside an apparatus. When it has already been registered, the switch function unit 131 updates the aging timer of the corresponding entry.

When determining that the frame is a copied frame by referring to a copy field of the header inside an apparatus, the frame transferring unit 13 determines that the frame has been transmitted from a transferring source, the frame transferring unit 12, and discards the frame to avoid a double transmission of the frame to a Ling Aggregation port. When it is not a copied frame, the frame transferring unit 13 continues the processing for determining an output port of the switch function unit 131, and outputs the frame to the determined port.

Thereby, the present embodiment realizes a function causing the retrieval tables 124 and 134 to correspond with each other, which is a feature of the present invention, by transferring a frame learned in the retrieval table 124 of the one side, the frame transferring units 12, to the other side, the frame transferring unit 13, and enabling the retrieval table 134 to learn like the above in the case of a Link Aggregation.

Entry information to the retrieval tables 134 of another frame transferring unit 13 is notified by transferring a frame to a main signal bus, so that it is notified at a high rate. In this case, the entry information is not notified through a CPU (Central Processing Unit) of the apparatus control unit 11, so that such problems including delay due to the processing by the CPU, increased workload of the CPU, and impossibility to manage the retrieval table in the case that the CPU is failed are not induced.

FIG. 2 is a diagram illustrating operations of the communication apparatus 1 according to an embodiment of the present invention, and FIG. 3 is a diagram illustrating a management processing of the retrieval table 124 and 134 according to the embodiment of the present invention. Operations of the communication apparatus 1 in the case of the communication between the host 3 and the host 4 will be described referring to FIG. 2 and FIG. 3.

In the communication apparatus 1, the host 3 is directly connected to the port 211 of the frame transferring unit 12, the host 5 is directly connected to the port 222 of the frame transferring unit 13, and the port 212 of the frame transferring unit 12 and the port 221 of the frame transferring unit 13 configure a Link Aggregation and are connected to the communication apparatus 2. The host 4 is connected to the communication apparatus 2, and addresses of the host 3 to 5 are designated as [A], [B], and [C] respectively.

In the Link Aggregation configuration between the communication apparatus 1 and 2, a port transmitting and receiving frames is determined by a distribution algorithm of each apparatus, and in the present embodiment, the port 212 is selected to transfer frames from the communication apparatus 1 to the communication apparatus 2, and the port 221 is selected to transfer frames from the communication apparatus 2 to the communication apparatus 1. And all the ports belong to the same VLAN (Virtual Local Area Network).

First, such a case will be described by using FIG. 2 that frames are transferred from the host 3 to the host 4. As the host 3 does not know an address of the host 4, it transmits a broadcast address as a destination address and [A] as a transmitting source address to the port 211 of the communication apparatus 1.

The switch function unit 121 of the frame transferring unit 12, which has received a frame, refers to the retrieval table 124 to check whether a transmitting source address of the received frame: [A] is registered. In this case, as the transmitting source address: [A] is not registered, an address: A and a port number: 211 are registered in the retrieval table 124.

As the above frame is a broadcast frame, it is outputted from all the ports 212, 221, and 222 excluding an input port 211 of the frame transferring unit 12, however the ports 212 and 221 belong to the Link Aggregation group, so that one output port is selected from ports in the Link Aggregation group according to the previously designated distribution algorithm. In the present embodiment, as the port 212 is selected, the frame is outputted from the port 212 to be transmitted to the host 4 through the communication 2, and is also transferred to the header editing unit 123.

As it is a frame from the switch function unit 121, the header editing unit 123 does not set a copy field of a header inside an apparatus, registers only an input port number: 211, attaches it to the frame, and transfers it to the frame transferring unit 13.

In the frame transferring unit 13, the switch function unit 131 checks whether the transmitting source address of the frame is registered in the retrieval table 134, and as it is not registered, registers the input port number: 211 and the address: [A] in the header inside an apparatus. This entry includes an aging timer, and is deleted after a certain period in time has passed.

Because the frame is not a copy frame as referring to a copy field of the header inside an apparatus, the processing is executed, which determines an output port of the switch function unit 131. As a result of the processing, the port 222 is determined as the output port, and the frame is transmitted from the port 222 to the host 5.

Next, such a case will be described that a frame is transferred from the host 4 to the host 3. The host 4 registers an address of the host 3, so that the frame is transmitted to the communication apparatus 2 by using [A] as a destination address and [B] as a transmitting source address. Like a port selection in the communication apparatus 1, an output port is also selected according to the distribution algorithm in the communication apparatus 2. In the present embodiment, the frame is outputted to the port 221.

The switch function unit 131 of the frame transferring unit 13, which has received the frame, refers to the retrieval table 134, and checks whether a transmitting source address of the received frame: [B] is registered. As it is not registered, the switch function unit 131 registers an address: [B], and a port number: 221 in the retrieval table 134.

As the above frame is a unicast frame, if the switch function unit 131 retrieves the retrieval table 134 by using a destination address: [A] as a key, the output port 211 is determined. While the frame is a unicast frame, the output port 211 is a port belonging to the frame transferring unit 12, so that it is transferred to the header editing unit 133.

As it is a frame from the switch function unit 131, the header editing unit 133 does not set a copy field of the header inside an apparatus, registers only an input port number: 221, attaches it to the frame, and transfers it to the frame transferring unit 12. In the frame transferring unit 12, the switch function unit 121 checks whether the transmitting source address: [B] is registered in the retrieval table 124, and as it is not registered, registers the input port number: 221 and the address: [B] in the header inside an apparatus. This entry includes an aging timer, and is deleted after a certain period in time has passed.

Because the frame is not a copy frame as referring to a copy field of the header inside an apparatus, the retrieval processing is executed which determines an output port of the switch function unit 121. As a result of the processing, the port 211 is determined as the output port, so that the frame is transmitted from the port 211 to the host 3.

Next, again, such a case will be described that a frame is transferred from the host 3 to the host 4. The host 3 registers an address of the host 4, so that the frame is transmitted to the communication apparatus 1 by using [B] as a destination address, and [A] as a transmitting source address.

The switch function unit 121 of the frame transferring unit 12, which has received the frame, refers to the retrieval table 124, and checks whether a transmitting source address of the received frame: [A] is registered. As it has been registered, an aging timer of the corresponding entry is updated.

In this case, as the frame is a unicast frame, if the switch function unit 121 retrieves the retrieval table 124 by using a destination address: [B] as a key, the port 221 is determined as an output port. However, the port 212 and the port 221 belong to the Link Aggregation group, so that the output port is determined as the port 212 according to the distribution algorithm. Here, a flow and a distribution algorithm between addresses [A] and [B] are fixed, so that the port 212 is always selected for the communication apparatus 2.

If the port 212 is always selected, a frame of the transmitting source address [A] becomes not to be transmitted to the frame transferring unit 13, so that if a period in time of the aging timer has passed, an entry of the address [A] of the retrieval table 134 is aged out to be deleted. Thus, when the frame is transferred from the host 4 to the host 3, such a problem mentioned above is induced that a broadcast is induced. However, in the present embodiment, the following processing updates the age timer so that an entry of the address [A] of the retrieval table 134 is not aged out, and enables the entry to be prevented from being deleted.

In this case, the frame is a unicast frame, and the output port 212 determined by the switch function unit 121 and the input port 211 belong to the same frame transferring unit 12, so that the switch function unit 121 transfers the frame to the frame identifying unit 122.

The frame identifying unit 122 identifies whether the input port or the output port determined by the switch function unit 121 is a port belonging to the Link Aggregation group, and as the output port 212 is a Link Aggregation port, it copies the frame, transmits the frame from the output port 212 determined by the switch function unit 121 to the communication apparatus 2, and at the same time, transfers the copied frame to the header editing unit 123.

As it is a frame from the frame identifying unit 122, the header editing unit 123 sets a copy field of the header inside an apparatus, registers an input port number: 211, and transfers it to the frame transferring unit 13. At this time, a data part of the copied frame is not necessary for the registration processing in the frame transferring unit 13, so that the header editing unit 123 deletes the data part of the frame.

In the frame transferring unit 13, the switch function unit 131 checks whether the transmitting source address: [A] is registered in the retrieval table 134, and as it has been registered, updates the aging timer of the corresponding entry. The frame transferring unit 13 determines from a copy field of the header inside an apparatus that the frame is a copy frame, and discards the frame to avoid a double transmission of the frame to a Link Aggregation port.

As described above, the frame learned in the retrieval table 124 of the frame transferring unit 12 is also transferred to the frame transferring unit 13, and as in the frame transferring unit 12, the frame is learned in the retrieval table 134, so that even if the communication is continued between the hosts 3 and 4 after that, it becomes such a state that entries of the addresses [A] and [B] correspond with each other in both of the retrieval tables 124 and 134 as illustrated in FIG. 3.

Meanwhile, such an operation is illustrated in FIG. 3 that an entry of the address [A] is registered in the retrieval table 124, a header of the frame is copied to be transferred to the frame transferring unit 13, and the frame transferring unit 13 learns the retrieval table 134, so that an entry of the address [A] is registered in the retrieval table 134. Every time the frame transferring unit 12 receives the frame of the transmitting source address [A], and the aging timer of an entry of the address [A] is updated, a copy frame is also transferred to the frame transferring unit 13, and the aging timer of an entry of the address [A] of the retrieval table 134 is also updated, so that the entry of the address [A] is not aged out, and is not deleted.

As described above, when the Link Aggregation set up between the frame transferring units 12 and 13 is configured, the present embodiment provides a function which causes the states of the retrieval tables 124 and 134 of the frame transferring units 12 and 13 to correspond with each other by copying (duplicating) a header of the received frame and directly transferring the copied frame to another frame transferring unit, so that it is possible to avoid such a situation that the retrieval tables 124 and 134 become not to correspond with each other, and broadcasts are induced.

When the Link Aggregation set up between the frame transferring units 12 and 13 is configured, the present embodiment solves such a problem that an address is not registered (learned) in one side, the frame transferring unit 13, and the retrieval tables 124 and 134 become not to correspond with each other, and broadcasts occur. In this case, each of the frame transferring units 12 and 13 provides only a function which copies and transfers the received frame, so that the load and the cost are not increased in the frame transferring units 12 and 13.

The present embodiment does not need the processing by a CPU of the apparatus control unit 11 to cause the retrieval tables 124 and 134 to correspond with each other, so that such problems including delay due to the processing by the CPU, increased workload of the CPU, and impossibility to manage the retrieval tables 124 and 134 in the case that the CPU is failed are not induced.

FIG. 4 is a block diagram illustrating a configuration of a communication apparatus according to another embodiment of the present invention. In FIG. 4, a communication apparatus 1a according to another embodiment of the present invention includes the same configuration as the embodiment of the present invention illustrated in FIG. 1 excluding three frame transferring units 12 to 14, and the same symbol is attached to the same component.

When a Link Aggregation is configured as set up among three or more frame transferring units 12 to 14, it is not identified which port of the frame transferring units 12 to 14 configuring the Link Aggregation is used for the transmitting and receiving. Thus, in the frame transferring units 12 to 14, all the entries of ports belonging to the Link Aggregation group must be caused to correspond with each other.

Therefore, in the frame identifying units 122, 132, and 142 of the above embodiment, a processing which determines a frame transferring unit transferring a copied frame is added to a processing identifying whether an input port or an output port determined by the switch function units 121, 131, and 141 is a port belonging to the Link Aggregation group.

A frame transferring unit to which a copied frame should be transferred is designated as a frame transferring unit including a port belonging to the Link Aggregation group. After the determination, as in the above embodiment, frames whose number is same as the number of the frame transferring units to which the copied frame should be transferred are copied to be transferred to a header editing unit. Meanwhile, the above copied frame is not transferred to a frame transferring unit to which the copied frame has not been determined to be transferred.

Thereby, the present embodiment causes all the entries of ports belonging to the same Link Aggregation group to correspond with each other in the retrieval tables 124, 134, and 144 of the frame transferring units 12 to 14, so that in any combination of ports for transmitting and receiving between ports configuring the Link Aggregation group, the present embodiment does not cause a broadcast.

In the above two embodiments, while a copied frame is transferred to another frame transferring unit 13 or 12 for a frame transmitted or received to/from a port configuring the Link Aggregation group in the frame identifying unit 122 or 132, as a third embodiment of the present invention, without identifying a Link Aggregation port in the frame identifying unit, for all the input frames, the copied frame may be transferred to another frame transferring unit and may be registered therein. Thereby, there is such an advantage that it becomes unnecessary to identify a Link Aggregation port in the frame identifying unit, and the processing is executed more easily and in a higher rate.

In addition, in the above two embodiments, while a registered entry of traffic communicated between ports in one frame transferring unit is registered only in a retrieval table of the frame transferring unit, in the third embodiment, all the entries including a registered entry of a frame transmitted and received in the Link Aggregation port are caused to correspond with each other in retrieval tables.

Thereby, for example, in the case that retrieval tables of the whole apparatus are obtained from an external monitoring apparatus managing the apparatus, the retrieval tables of the whole apparatus are obtained by referring to only one retrieval table in the third embodiment, while it is necessary to refer to all the retrieval tables in the above two embodiments.

A layer 2 switch apparatus according to an exemplary embodiment of the present invention may include a function that causes the states of the retrieval tables which are independently managed to correspond with each other by providing each of the plurality of frame transferring units (e.g. line card, etc.) with a retrieval table including entries obtained by combining an address and a port number, and copying (duplicating) a header of the received frame to directly transfer it to another frame transferring unit.

Thereby, when the Link Aggregation set up between the frame transferring units is configured, the layer 2 switch apparatus according to the present invention solves such a problem that addresses are not registered (learned), associations are lost between the retrieval tables, and broadcasts occur. In this case, each of the frame transferring units is provided with only the function that copies and transfers a header of the received frame, so that the load and the cost are not increased in the frame transferring units.

More specifically, the layer 2 switch apparatus according to the present invention may include: a unit identifying a frame transmitted and received at a port configuring a Link Aggregation; a unit directly transferring the frame to a switch function unit of another frame transferring unit; and a unit learning a transmitting source address and a receiving port of the transferred frame, and discarding them after registering in the retrieval table, to cause the retrieval tables to correspond with each other between the frame transferring units to solve the above problem.

As described above, when the Link Aggregation set up between the frame transferring units is configured, the layer 2 switch apparatus according to the present invention includes a function that causes the states of the retrieval tables of the plurality of frame transferring units to correspond with each other, so that it is possible to avoid such a situation that associations are lost between the retrieval tables, and broadcasts are induced.

In addition, the layer 2 switch apparatus according to the present invention does not need the processing by a CPU (Central Processing Unit) of an apparatus control unit for the processing to cause the retrieval tables to correspond with each other, so that such problems including delay due to the processing by the CPU, increased workload of the CPU, and impossibility to manage the retrieval table in the case that the CPU is failed are not induced.

An exemplary advantage according to the invention is that it is possible to avoid such a situation that the retrieval tables become not to correspond with each other, and broadcasts are induced, without increasing the load and the cost in the frame transferring units by virtue of the above configuration and operations.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication apparatus, comprising:
a plurality of frame transferring units being provided with a retrieval table for retrieving an output port of a frame and including a switch function unit,
wherein the communication apparatus configures a Link Aggregation between the frame transferring units,
wherein each of the plurality of frame transferring units causes the states of the retrieval tables to correspond with each other among the frame transferring units by copying a frame determined to be transmitted and received at a port among the ports configuring the Link Aggregation between the frame transferring units and directly transferring the copied frame to a switch function unit of another frame transferring unit,
each of the plurality of frame transferring units includes:

as a function causing the states of the retrieval tables to correspond with each other,
a unit identifying a frame transmitted and received at a port configuring the Link Aggregation;
a unit, after copying the identified frame, directly transferring the copied frame to the switch function unit of another frame transferring unit; and
a unit learning a transmitting source address and a receiving port of the frame copied in another frame transferring unit and transferred therefrom, and discarding them after registering in the retrieval table,
the unit directly transferring the copied frame to the switch function unit of another frame transferring unit copies a frame which is determined to be transmitted and received at a port configuring the Link Aggregation, outputs the copying source frame to the determined port, attaches information indicating that the frame is a copied frame to the copied frame, and directly transfers the copied frame to the switch function unit of another frame transferring unit, and
the unit directly transferring the copied frame to the switch function unit of another frame transferring unit deletes a data part of the copied frame, and directly transfers the copied frame to the switch function unit of another frame transferring unit.

2. The communication apparatus according to claim 1, wherein the communication apparatus is a layer 2 switch apparatus.

3. The communication apparatus according to claim 1, wherein the retrieval table includes entries obtained by combining addresses and port numbers through the use of a destination address of the frame as a key, and is independently managed in each of the plurality of frame transferring units.

4. A retrieval table management method,
wherein the retrieval table management method is used for a communication apparatus which includes a plurality of frame transferring units provided with a retrieval table for retrieving an output port of a frame and including a switch function unit, and configures a Link Aggregation set up among the frame transferring units,
each of the plurality of frame transferring units causing states of the retrieval tables to correspond with each other among the frame transferring units by copying an input frame inputted from a port among the ports configuring the Link Aggregation between the frame transferring units and directly transferring the copied frame to a switch function unit of another frame transferring unit,
the retrieval table including entries obtained by combining addresses and port numbers through the use of a destination address of the frame as a key, and is independently managed in each of the plurality of frame transferring units, and
the step of directly transferring the copied frame to the switch function unit of another frame transferring unit includes:
deleting a data part of the copied frame; and
directly transferring the copied frame to the switch function unit of another frame transferring unit.

5. The retrieval table management method according to claim 4,
wherein the communication apparatus is a layer 2 switch apparatus.

* * * * *